United States Patent [19]

Ichizuka

[11] Patent Number: 4,718,618
[45] Date of Patent: Jan. 12, 1988

[54] METHOD FOR FEEDING FILM

[75] Inventor: Akira Ichizuka, Ayase, Japan

[73] Assignee: Fuji Photo Film Co., Ltd., Minami-Ashigara, Japan

[21] Appl. No.: 908,501

[22] Filed: Sep. 17, 1986

[30] Foreign Application Priority Data

Sep. 28, 1985 [JP] Japan ................................ 60-215624

[51] Int. Cl.[4] .............................................. G03B 1/04
[52] U.S. Cl. .................................................. 242/195
[58] Field of Search ....................... 242/195, 197, 188;
226/45; 352/124, 235, 236; 360/96.1, 95

[56] References Cited

U.S. PATENT DOCUMENTS

| | | | |
|---|---|---|---|
| 3,217,996 | 11/1965 | Bernier | 242/188 |
| 3,675,877 | 7/1972 | Rempala | 242/195 X |
| 3,885,756 | 5/1975 | Uehara et al. | 242/195 |
| 4,076,400 | 2/1978 | Persha et al. | 242/195 X |
| 4,432,509 | 2/1984 | Shirai et al. | 242/195 |

Primary Examiner—John M. Jillions
Assistant Examiner—Steven M. duBois
Attorney, Agent, or Firm—Wenderoth, Lind & Ponack

[57] ABSTRACT

In a film reader system in which a film provided with a leader film having a width wider than the width of end flanges of a reel around which the film is wound is wound up around another reel, when a wind-back motor is driven at high speed to wind back around the first mentioned wind-back reel, the leader film is detected by a pair of pinch rollers on the way of the film travelling. Upon the detection, the wind-back motor is electrically braked and the wind-up motor is reversely driven at high speed in the film wind-back direction to release the leader film from the wind-back reel. The wind-back and wind-up motors are then driven in synchronized manner at low speed in the film wind-back direction and the wind-back motor is again driven at high speed upon the detection of the leader film passing the detecting pinch rollers.

3 Claims, 8 Drawing Figures

METHOD FOR FEEDING FILM

BACKGROUND OF THE INVENTION

This invention relates to a method for feeding a film in a microfilm reader, for example, and more particularly to a method for winding back a film provided with a leader film wound once around a wind-up reel.

With a known device provided with a cartridge in which a microfilm wound around a reel is accommodated, in a case where it is required to feed or wind back the microfilm, there is used a microfilm to the front end of which a leader film having a width wider than that of the microfilm is attached to prevent the microfilm from being entirely wound up around the reel and to readily be wound off again. One example of the microfilm of this type is shown in FIG. 2 and a picture image 3 and a blipmark or film mark 4 corresponding to the picture image 3 are photographed on the microfilm 1, the front end of which is joined with a leader film 2 through a splicing tape 5.

FIG. 1 is a schematic perspective view of one example of a conventional microfilm reader adapted for applying the method of this invention, and referring to FIG. 1, the microfilm 1 is wound around a reel 10 which is accommodated in a cartridge 11 and a feed-out roller 12 is rotated while being pressed against the leader film 2 at the feed opening of the cartridge 11. The leader film 2 thus fed is transferred and then wound up around an auto-reel 15 for winding up the microfilm 1. A pair of pinch rollers (or odometer rollers) 16 are disposed along the microfilm travelling path so as to clamp the microfilm 1 for assisting the travelling of the microfilm 1. The auto-reel 15 is connected to a drive shaft of an electric motor (M2) 14 which can be driven in a reversible manner at high and low speeds continuously or stepwisely. Under the condition shown in FIG. 1, when the motor 14 is driven, the microfilm 1 is fed or wound back and the picture image information on the microfilm 1 is focused on a screen, not shown, by projecting a light from a light source 17 on the microfilm by the use of a lens unit 18. The focused picture image information is searched, and after the searching operation, an electric motor (M1) 13 is driven at high speed to wind back the microfilm 1 around the reel 10 in the cartridge 11. The motor 13 can also be driven in a reversible manner at high and low speeds continuously or stepwisely. When the leader film 2 reaches the reel 10, the leader film 2 is wound around the outer periphery of the flanged portions 10A and 10B of the reel 10 without being wound around the reel 10 because the leader film 2 has a width wider than the distance between the flanged portions 10A and 10B which is generally substantially equal to the width of the microfilm 1 as best illustrated in FIG. 6A. With the device of the construction described hereinbefore, however, the leader film 2 may be pulled into the gap between the flanged portions 10A and 10B as shown in FIG. 6B because of the large inertia force of the motor (M1) 13 driven at high speed when an excessive tension caused by the friction resistance in a film reader system including the motor (M2) 14 is applied to the microfilm 1. This phenomenon will damage the leader film 2 and make it impossible to smoothly feed again the microfilm 1 from the reel 10, and moreover, this phenomenon will be frequently caused in a case where the whole length of the microfilm used is relatively short and the diameter of the microfilm 1 wound around the reel 10 is considerably smaller than the outer diameter of the flanged portions 10A and 10B of the reel 10.

SUMMARY OF THE INVENTION

An object of this invention is to elimate defects or disadvantages encountered in the prior art technique and to provide a method for winding back a microfilm provided with a leader film having a width wider than that of the microfilm so as not to wind up the leader film on a reel around which the microfilm is wound up and which has end flanges having distance therebetween smaller than the width of the leader film.

Another object of this invention is to provide a method for winding back the microfilm in which the travelling of the leader film is precisely detected by a detecting member, and upon detection thereof, a wind-back motor operatively connected to the reel is electrically controlled.

These and other objects can be achieved, according to this invention, by providing a method for winding back a film in a film reader system of the type comprising a first reel around which a film provided with a leader film is wound, a wind back motor operatively connected to the first reel to drive the same, a second reel around which the film is wound, a wind-up motor operatively connected to the second reel, and a mechanism located along the film travelling path between the first and second reel for detecting the passing of the film, the method comprising the steps of preparing a film provided with a leader film having a width wider than a distance between end flanges of the first reel, driving the wind-up motor to wind up the film around the second reel, winding back the film by driving the wind-back motor at high speed, detecting the leader film by the detecting mechanism during a film wind-back operation, braking the wind-back motor upon detection of the passing of the leader film and driving the wind-up motor reversely at high speed in the film wind-back direction to release the leader film from the first reel, driving the wind-back motor and the wind-up motor at low speed in a synchronized manner in the film wind-back direction, and driving the wind-back motor again at high speed upon detecting the leader film passing the detecting mechanism.

The nature, principle and utility of the invention will become more apparent from the following detailed description when read in conjunction with the accompanying drawings.

DESCRIPTION OF THE PREFERRED EMBODIMENTS

Figure 1:
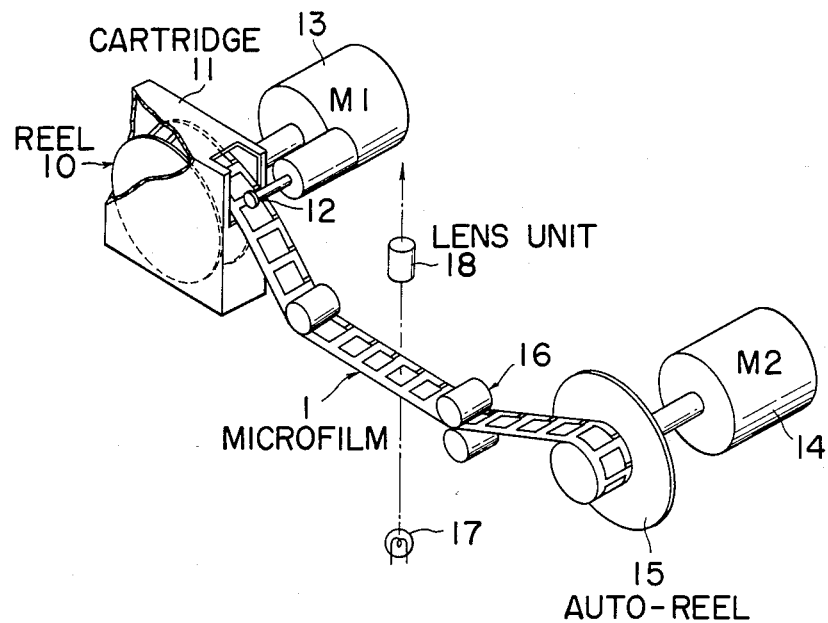
FIG. 1 is a diagram showing one example of a microfilm reader of the type conventionally known to which this invention is to be applied.
Figure 2:
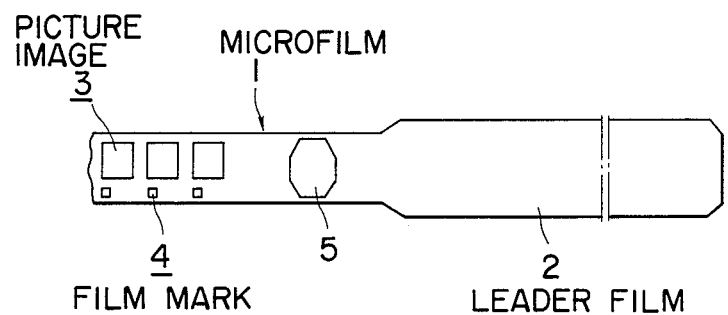
FIG. 2 is a front view of a microfilm provided with a leader film which is utilized for this invention.

The method of this invention is disclosed in detail hereunder in application to a microfilm reader shown in FIG. 1, in which the transferring movement of a leader film 2 is detected by a pair of pinch rollers 16 (16A, 16B) arranged at positions suitable for clamping the microfilm 1 thereby to precisely wind back the microfilm 1. The details of the pinch rollers 16 are explained with reference to FIGS. 4A and 4B, in which one pinch roller 16A is provided with circumferential projections 160A coaxially formed around the outer surface of the pinch roller 16A near both ends thereof and the other pinch roller 16B is provided with circumferential grooves 160B coaxially formed on the outer surface of the pinch roller 16B near both ends thereof so that the projections 160A are fitted in the grooves 160B respectively when the pinch rollers 16A and 16B are arranged in positions as shown in FIG. 1. In an alternative embodiment, the pinch rollers 16A and 16B are constructed to be engageable by arranging spring means, not shown, so as to constitute the paired pinch rollers, and in this alternation, the shaft of the pinch roller 16A will be mounted so as to be rotatable and the shaft of the pinch roller 16B will be urged by the spring means so that the pinch roller 16B will be moved towards the pinch roller 16A under the urged or pulled condition of the shaft of the pinch roller 16B. It should be noted that the distance between the projections 160A of the pinch roller 16A, i.e. the distance between the grooves 160B of the pinch roller 16B, is substantially larger than the width of the microfilm 1 and smaller than the width of the leader film 2 attached to the microfilm 1.

Figure 4A:
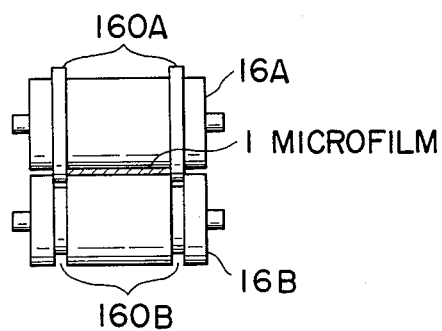
FIGS. 4A and 4B are front views of the pinch rollers.
Figure 4B:
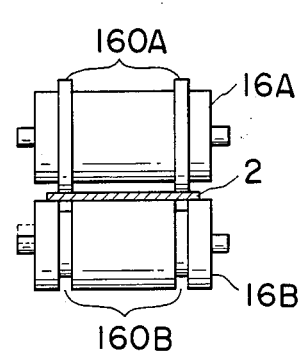

Accordingly, in an actual operation of the device shown in FIG. 1, when the microfilm 1 is transferred, the projections 160A are engaged with the grooves 160B with the microfilm 1 interposed or clamped therebetween as shown in FIG. 4A, whereas when the leader film 2 is transferred between the pinch rollers 16A and 16B, the leader film 2 moves the rollers to move the projections 160A out of the grooves 160B and the leader film 2 is introduced between the projections 160A and the grooves 160B as shown in FIG. 4B, whereby the shaft of the pinch roller 16B is shifted.

Figure 3:
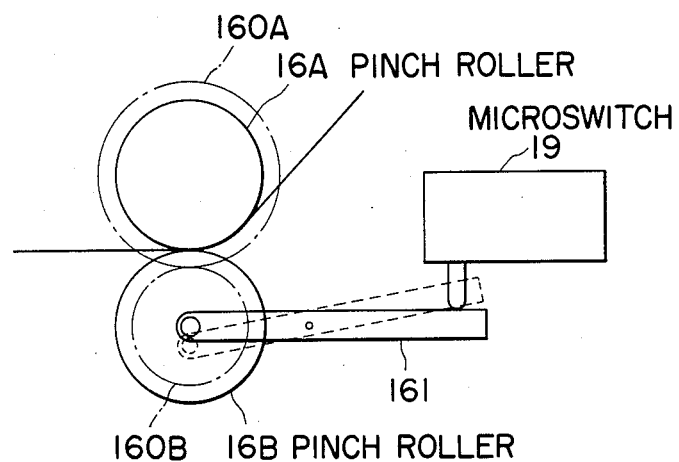
FIG. 3 is a schematic side view of pinch rollers.

A microswitch 19, for example, is connected to the shaft of the pinch roller 16B through a drive lever 161 as shown in FIG. 3 to detect the shifting or displacement of the shaft of the pinch roller 16B, thereby to confirm the fact that the leader film 2 is in the space between the pinch rollers 16A and 16B by detecting the nature of the ON-OFF signal from the microswitch 19.

Figure 5:
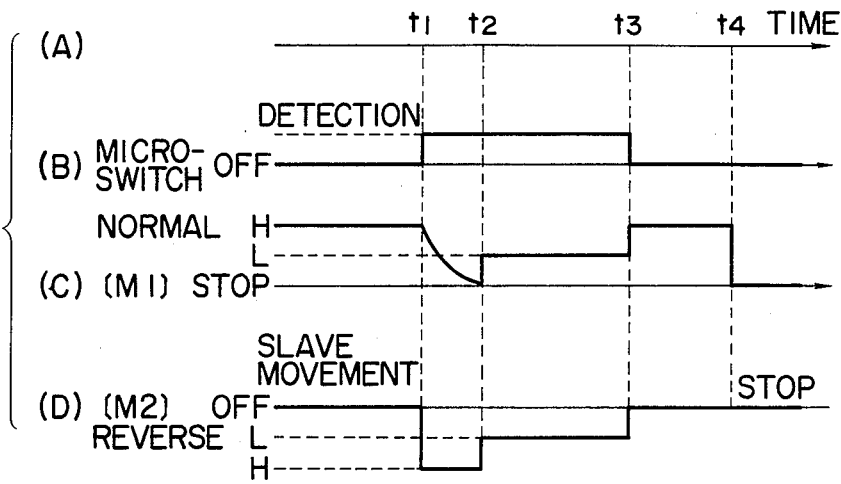
FIG. 5 shows timing charts (A) through (D) for explaining the operation of the method of this invention.
Figure 6A:
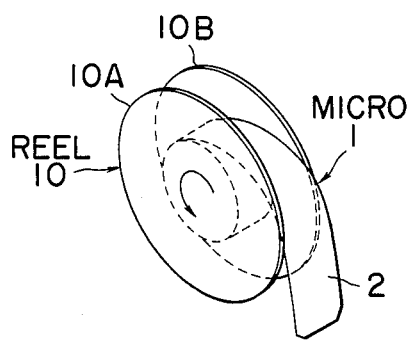
FIGS. 6A and 6B are schematic perspective views of reels around which the film is wound up.
Figure 6B:
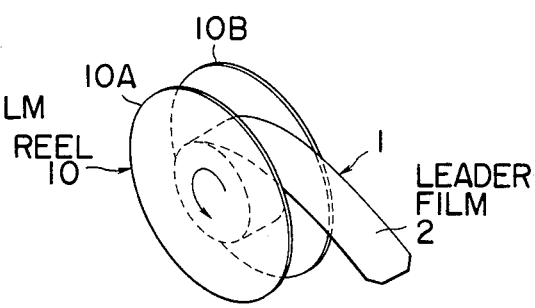

The microfilm wind-back method according to this invention will be described hereunder with reference to the time charts (A) through (D) of FIG. 5.

As described before, FIG. 1 shows the condition that the leader film 2 of the microfilm 1 wound up around the reel 10 accommodated in the cartridge 11 is transferred therefrom and wound up around the winding-up auto-reel 15. At the operation start, the microfilm 1 under this condition is being wound up by the wind-up motor (M2) 14, and simultaneously the picture information on the microfilm 1 is searched. After the completion of searching, the wind-back motor (M1) 13 is driven in an ordered direction at high speed to wind back the microfilm 1. During the film wind-back operation, when the leader film 2 reaches the pinch rollers 16 (16A,16B) at a time shown by time point t1 of FIG. 5, the microswitch 19 connected to the pinch rollers detects this fact and generates a detection signal (see chart (B) of FIG. 5). When the signal is received by a control unit, not shown, the control unit outputs a signal to the motor (M1) 13 for electrically braking the operation thereof as shown by the chart (C) of FIG. 5, and at the same time, as represented by the chart (D) of FIG. 5, the control unit also outputs a signal to the motor (M2) 14, which is now followed by the film wind-back movement, to reversely drive the motor 14 in the film wind-back direction at high speed. When this operating condition has continued for about 0.2 sec. (time point t2 in the chart (A) of FIG. 5), the leader film 2 wound around the auto-reel 15 connected to the shaft of the motor (M2) 14 becomes free from the tension because the wind-back motor (M1) 13 is now electrically braked while the wind-up motor (M2) 14 is being reversely driven in the wind-back direction at high speed. Under this condition, the motor (M1) 13 is driven in the wind-back direction at low speed, together with the motor (M2) 14 in the same direction at low speed in a synchronized manner thereby to wind back the microfilm 1 and the leader film 2. When the rear end (i.e. front end in the film wind-up operation) of the leader film 2 reaches the space between the pinch rollers 16(16A,16B) (time point t3 shown in FIG. 5 (A)), the operation of the motor (M2) 14 stops and the motor (M1) 13 is then driven again in the film wind-back direction at high speed. The motor (M1) 13 stops after the film wind-back operation, and the entire film winding-back operation is completed.

As an alternative, the microswitch 19 of the embodiment described above, any means for detecting the displacement of the shaft of the pinch roller such as a proximity switch may be used, and otherwise, it is to be noted that the leader film can be directly detected by an optical means without detecting the displacement of the pinch roller. Moreover, although in the foregoing, a device or system which utilizes a microfilm reader is referred to, this invention is not limited to utilization in such device or system and every type of microfilm feeding system or a feeding system for a lengthy film provided with a wide leader film could use this invention.

According to this invention, when the microfilm is wound back, the leader film is detected along the wind-back travelling path, and upon the detection of the leader film, the wind-back motor is electrically braked, but the wind-up motor is reversely driven at high speed in the wind-back direction to eliminate the tension applied to the film. Under these condition, since the microfilm is wound back, the film can be wound back around the reel accommodated in a cartridge without winding up the leader film on the reel, thus facilitating the next film feeding operation. In addition, the film can be safely wound back around the reel without damaging the same and the time lost during which tension is applied to the leader film is quite small and will thus be negligible.

It should be understood that many modifications and adaptations of the invention will become apparent to those skilled in the art and it is intended to encompass such obvious modifications and changes in the scope of the claims appended hereto.

What is claimed is:

1. A method for feeding a film in a film reader system of the type having a first reel around which a film provided with a leader film is wound, a wind-back motor operatively connected to said first reel to drive the same, a second reel around which the film is wound, a wind-up motor operatively connected to said second reel, and a detecting means located along the film travelling path between said first and second reel for detecting the passing of the film, said method comprising the steps of:

preparing a film provided with a leader film having a width greater than the distance between end flanges of said first reel;

driving said wind-up motor in a direction to wind up the film around said second reel;

stopping driving said wind-up motor when the desired amount of film has been wound up;

winding back the film by driving said wind-back motor at high speed in a direction to rewind the film around said first reel;

detecting the passage of said leader film past said detecting means during a film wind-back operation;

braking said wind-back motor upon detection of the passage of said leader film and reversely driving said wind-up motor at high speed in a film wind-back direction to release said leader film from said first reel;

thereafter driving said wind-back motor and said wind-up motor at low speed in a synchronized manner in the film wind-back direction, and, finally, driving said wind-back motor at high speed again upon detecting the passage of the end of said leader film past said detecting means.

2. The method according to claim 1 wherein said detecting step comprises providing as the detecting means a pair of pinch rollers located on both sides of the film so that the film passes a gap formed between said pinch rollers, one of which is provided with circumferential projections at both ends thereof and the other of which is provided with circumferential grooves at both ends thereof corresponding to said projections respectively, the distance between said projections being larger than the width of the film and smaller than the width of the leader film.

3. The method according to claim 1 wherein the braking step comprises operating said wind-back motor electrically upon the detection of the passage of the leader film through said detecting means.

* * * * *